Aug. 4, 1959 — J. P. WATSON — 2,898,396
WIRE SEAL
Filed March 25, 1957 — 2 Sheets-Sheet 1
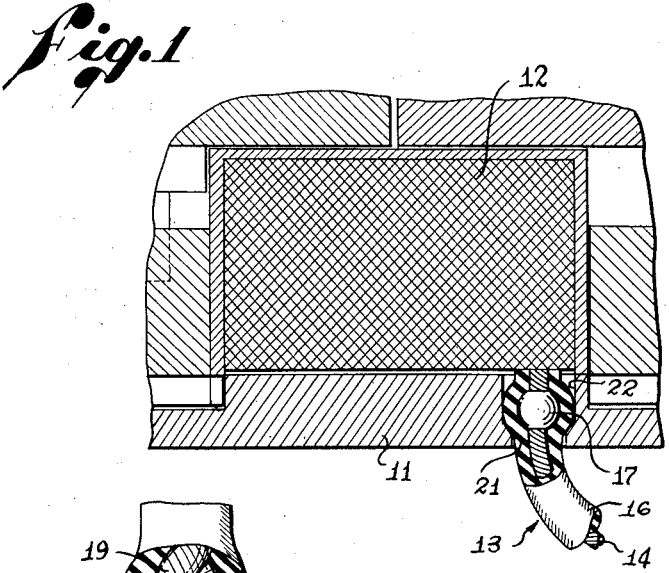
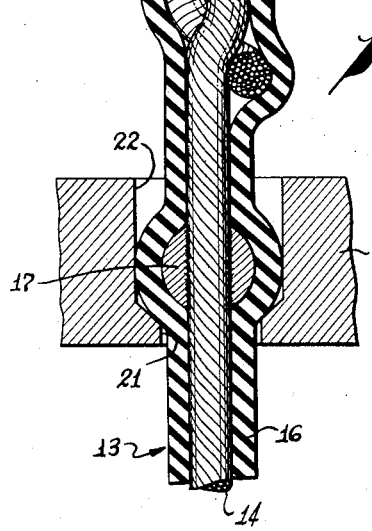
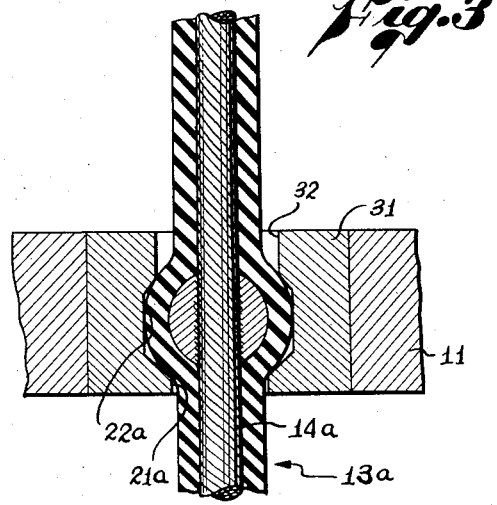
INVENTOR.
JAMES P. WATSON
HERZIG & JESSUP
ATTORNEYS
By Warren T. Jessup Aug. 4, 1959   J. P. WATSON   2,898,396
WIRE SEAL Filed March 25, 1957   2 Sheets-Sheet 2

SOLDER OR RESIN FILLED

SOLDER

JAMES P. WATSON
INVENTOR.

HERZIG & JESSUP
ATTORNEYS
By Warren T. Jessup

United States Patent Office 2,898,396
Patented Aug. 4, 1959

2,898,396

WIRE SEAL

James P. Watson, Whittier, Calif.

Application March 25, 1957, Serial No. 648,219

2 Claims. (Cl. 174—152)

This invention relates to the sealing of a lead or wire to a wall, where it passes through the wall, which may be, for example, the housing of an electrical apparatus.

It is an object of this invention to provide an improved sealing arrangement for sealing a wire where it passes out of a sealed casing.

It is another object of this invention to provide a simplified wire sealing arrangement which does not require any bonding or fusing, at the time of installation.

It is another object of this invention to provide a wire seal in which both the conductor and the insulating sleeve are unbroken in their passage through a wall.

It is another object to provide a seal where a wire passes through a wall, that requires but little more space than the wire itself.

It is another object of this invention to provide a seal readily adaptable for several close spaced wires, which allow each wire to be installed and removed independently of the other, and which can be reinstalled readily after removal.

In accordance with these and other objects which will become apparent hereinafter, preferred forms and examples of the present invention will now be described with reference to the accompanying drawing wherein:

Figure 1 is a fragmentary longitudinal section illustrating generally an electrical apparatus contained within a cylindrical casing, and more specifically, taken from my copending application Serial No. 607,422, filed August 31, 1956, for Axial Flux Electro-Magnetic Machinery, of which this application constitutes a continuation-in-part.

Figure 2 is a fragmentary enlarged section of the wire seal portion of Figure 1;

Figure 3 is a section similar to Figure 2, showing a modification of the wire seal;

Figure 4:
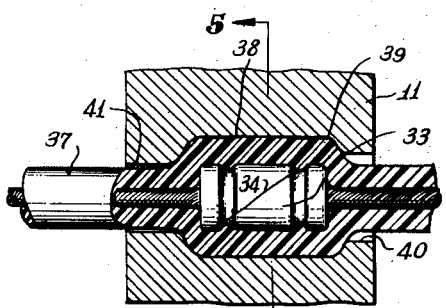
Figure 4 is a sectional view of another modification of the wire seal.

In Figure 1, 11 represents a wall through which it is desired to pass an electrical lead or conductor, in sealing relation. In the present instance, the wall 11 is shown as a cylindrical casing around certain electro-magnetic machinery.

In the example shown in Figure 1, the machinery embodies a circular coil 12, to which electrical connection is made by a plurality of insulated leads, one of which is shown at 13.

In Figure 2, the lead 13 is shown as a stranded, twisted wire 14 covered by a single insulating sheath or tube 16. In accordance with the present invention, simple effective means are provided for sealing the insulated conductor 13 to the wall 11, where it passes through a hole or bore in the wall.

In accordance with the invention, an enlargement 17 is affixed to the wire 14. This enlargement is preferably formed by soldering or brazing a ball of metal onto the wire. Since the conductor 14 is stranded, it is preferred, in the soldering or brazing operation, to flow the molten metal into the interstices between the strands of the wire 14, and bond the metal to these strands, so that fluid cannot pass axially along the wire 14—being barred at the point of engagement 17.

The insulation 16, which is pliant and resilient, is slipped over the wire 14 and over the enlargement 17. It is a feature of the present invention that this structure readily lends itself to allowing the single insulating tube 16 to be slipped also over a joint 18 formed between the wire 14 and the terminal wire 19 of the coil 12, before the lead is drawn into its seat, thus preventing further movement of the tube 16 on the wire 14.

Where the wire 13 passes through the housing or case 11, the wall of the case is bored as shown at 21, and is counterbored from the inside of the case, as shown at 22. The outer diameter of the insulation over the enlargement 17 is such that it cannot be drawn through the bore 21 and fits snugly in the counter-bore 22.

With a structure thus described, the wire or lead 13 is passed outwardly through the bore 21; on further outward pulling, the enlargement 17 is drawn firmly into the counter-bore 22. The pliancy and resiliency of the insulation 16 provides a tight seal between the case 11 and the enlargement 17 in the area where the counter bore 22 surrounds the enlargement 17. The relative size of the parts prevents the lead 13 from being further pulled outward of the case 11.

The physical presence of the coil 12 prevents movement of the wire inward, as shown in Figure 1, thereby retaining the seal between the case and the wire.

As shown, it is not necessary for the enlargement 17 to be larger than bore 21. It may in fact be somewhat smaller, depending on the thickness and character of the insulation 16. It is only necessary that the enlargement and insulation together be large enough to block the wire from being pulled through the bore 21.

In case difficulty is experienced in making or fabricating the internal counter-bore 22, a portion of the casing wall 11 through which the lead 13 passes may be made as a separate insert 31, shown in Figure 3. With the structure shown in Figure 3, the counter-bore 22a may be readily formed in the insert 31, which is then pressed into the case 11, either from the outside or the inside, as described. The lead 13a is then drawn into the bore in the manner described above in connection with Figures 1 and 2.

Figure 3 also illustrates a modified feature which may be employed with either the insert type of bore shown in Figure 3, or the integral type shown in Figure 2. This feature involves an ensmallment of the counter-bore 22a, as shown at 32. As the lead 13a is pulled through the bore 21a, when the enlargement encounters the bore 32, it is necessary to pull forcefully to cause the enlargement to enter into that portion of the bore having the maximum diameter. It is held then in a sort of pocket with further outward pulling or movement being prevented by the bore 21a, and with inward pulling or movement being inhibited by the bore 32.

Figure 5:
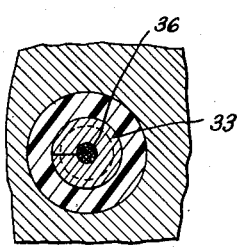
Figure 5 is a cross-section taken on line 5—5 in Figure 4.
Figure 6:
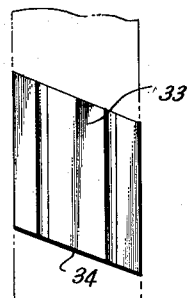
Figure 6 is a developed view of the seal of Figure 4 before an application to the wire.

In the modification shown in Figures 4, 5 and 6, the enlargement is formed of a strip of metal 33, cut on the bias as shown at 34, and wrapped around the wire 36, as best seen in Figure 5. The biased edges 34 come together as shown in Figure 4, and solder is flowed into the crack to form a bond. The soldering also fills the interstices between the strands of wire, so that fluid cannot leak past the wall 11 longitudinally through the wire.

As in the previously described forms of the invention, the pliant sleeve or tube of insulation 37 presses outwardly into firm engagement with the walls of the passage or bore at 38, completely circumferentially around the tube, and thereby forms a hermetic seal, preventing passage of fluid from one side of the wall to the other.

In the embodiment shown in Figure 4, the seal is pulled into place by drawing the enlargement 33 into the enlarged portion of the bore, shown at 39, relying on the resiliency and pliancy of the tube 37 to permit the tube to squeeze inward as it passes through the smaller portion of the bore shown at 40. The bore 41 is smaller than 40 to preclude putting the wire therethrough. The cylindrical form of the enlargement 33 prevents rocking of the enlargement during bending of the wire external of the wall 11, thereby enhancing the seal at 38.

Figure 7:
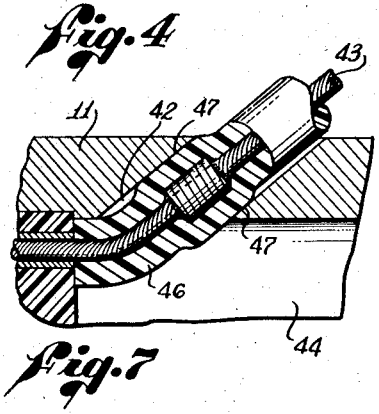
Figure 7 is a section of a different embodiment of the present invention.

In the embodiment shown in Figure 7, the passage or bore 42 is formed obliquely in the wall 11 in order to enable the wire 43 to be drawn more readily from the interior of the housing 44. This configuration is particularly useful in miniature equipment where space limitations are very stringent. In this embodiment, the passage or bore 42 does not have an ensmalled portion at either end, since the firm and close anchorage of the conductor to its terminal within the case precludes the necessity of such further anchorage. As in the other embodiments, the pressure between the bore and the pliant tube 46 which is effected peripherally at 47 produces the required hermetic seal.

Figure 8:
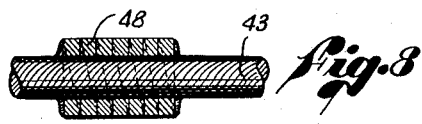
Figure 8 is an enlarged further sectioned view of the form of the invention shown in Figure 7.

The enlargement illustrated in Figures 7 and 8 is formed by spirally winding a wire or filament 48 of square cross-section around the base or master wire 43. At each end, the winding is cut on a bias so that a square or flat end is formed at each end of the resulting cylindrical enlargement. As in the other embodiments, the enlargement is bonded to the wire 43, and the interstices between the wire 43 are filled in, by flowing solder into the interstices of the strands of the wire 43 and into the interstices between the wrap-around wire 48. Wire 48 is of square cross-section in order to present a smoother external surface than would be presented by a round wire. Round wire can be used if outer surface is sufficiently filled with solder, or if tube 46 is sufficiently pliant to fill the helical grooves between turns.

Figure 9:
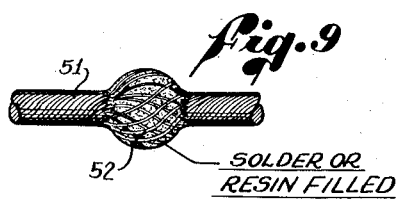
Figure 9 illustrates still another form of the present invention.

In the embodiment shown in Figure 9, the strands of the master wire 51 are bulged outwardly, as shown at 52, and solder or resin is flowed into the resulting space to produce the solid ball effect illustrated.

Figure 10:
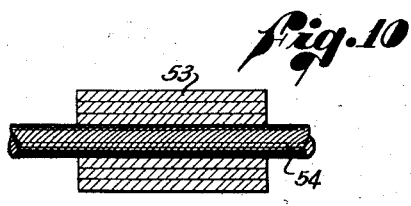
Figure 10 is still another form of the present invention.

In Figure 10, a flat ribbon 53 is spirally wound around the master wire 54 and cut on a bias, both interiorly and exteriorly, to form a smooth enlargement around the wire 54. As in the other embodiments, the interstices are filled with solder or other suitable bonding material.

Figure 11:
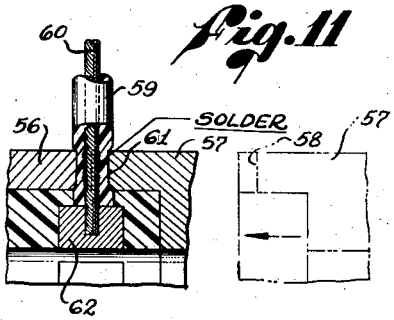
Figure 11 is still another form of the present invention, which effects the seal without any enlargement of the wire.
Figure 12:
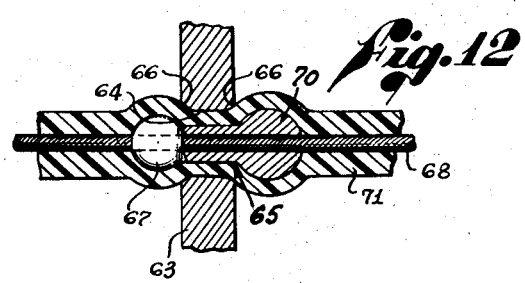
Figure 12 is an illustration of a form of the invention particularly applicable to thin wall mounting.

In the embodiment shown in Figure 11, the enlargement is omitted, and instead the passage through the wall is formed at a point where a cylindrical portion of the casing 56 is capped by an end bell 57. This is effected by forming a semi-circular recess 58 in the opposing edges of the two walls 56 and 57. A structure is thus effected making possible the placement of the wire 60 and insulating tube 59 in one of the recesses and effecting a seal by bringing the end bell 57 into firm engagement and registry with the casing body 56, squeezing the pliant tube inward at 61 to effect a seal therearound. Longitudinal movement of the wire 60 is prevented by the proximity of the terminal 62 to which the wire 60 is bonded just inside the passageway.

Where a very thin wall 63 is encountered, the structure shown in Figure 12 is preferred. Here a dumbbell-like anchor 65 is secured to the conductor 68 and an unbroken insulation tube 71 is slipped thereover, as shown. The wire is then pulled into place from right to left, the ball 70 being larger than the ball 67 and the bore 64, to positively prevent complete pull-through. Since the balls 67 and 70 may be spaced apart to close tolerances, a seal is effected around each end of the bore 64, as shown at 66, as well as along the length of the bore 64.

While the instant invention has been shown and described herein in what is conceived to be the most practical and preferred embodiments, it is recognized that departures may be made therefrom within the scope of the invention, which is therefore not to be limited to the details disclosed herein, but is to be accorded the full scope of the claims.

What is claimed is:

1. Means for sealing wires passing through a wall having a bore opening therethrough, a portion of said bore opening being enlarged by a cylindrical counterbore, a stranded wire passing through said bore, an enlargement circling said wire and bonded thereto, the bonding material also filling the interstices between the strands of said wire to block passage of fluids longitudinally between said strands, the diameter of said enlargement being at least almost as large as the diameter of said counterbore, said enlargement being disposed with its portion of largest diameter within said cylindrical counterbore, and an unbroken continuous tube of pliant insulation around said wire and extending on each side of said wall and covering said enlargement, said enlargement and tube having a diameter adapted to frictionally engage the cylindrical wall of the counterbore to prevent removal of the wire in the direction of said bore opening, said tube being under radial compression to hermetically seal the space between said enlargement and the cylindrical wall of said counterbore.

2. The invention defined in claim 1 including a restriction in said counterbore at the end thereof opposite said bore opening, said restriction being of a diameter to permit said enlargement with said tube thereover to be pulled forcefully therethrough into said counterbore but to resist withdrawal thereof through said restriction.

References Cited in the file of this patent

UNITED STATES PATENTS

| | | |
|---|---|---|
| 263,801 | Nichols | Sept. 5, 1882 |
| 2,563,829 | Fitzgerald et al. | Aug. 14, 1951 |
| 2,624,286 | Smith | Jan. 6, 1953 |
| 2,651,672 | Ivanoff | Sept. 8, 1953 |

FOREIGN PATENTS

| | | |
|---|---|---|
| 481,855 | Canada | Mar. 18, 1952 |

UNITED STATES PATENT OFFICE
CERTIFICATE OF CORRECTION

Patent No. 2,898,396                                August 4, 1959

James P. Watson

It is hereby certified that error appears in the above numbered patent requiring correction and that the said Letters Patent should read as corrected below.

-- In the drawings, Sheet 1, in Fig. 2, the numeral "19" should designate the wire coming from the top rather than the wire coming from the bottom and the lead line from the numeral "18" should terminate outside of the device and have an arrow at the end thereof to indicate that the numeral "18" designates the entire joint. --; Sheet 2, in Fig. 4, strike out the numeral "39" and its lead line. --; in the printed specification, column 1, line 33, for "other" read -- others --; line 54, strike out "an"; column 3, line 14, for "bore" read -- counterbore --; line 19, for "39" read -- 38 --; line 23, for "putting" read -- pulling --; column 4, line 17, for "and the" read -- or the --.

Signed and sealed this 5th day of January 1960.

(SEAL)
Attest:

KARL H. AXLINE                                             ROBERT C. WATSON
Attesting Officer                                       Commissioner of Patents